March 30, 1926.
G. W. SHORT
SAFETY FRUIT CLIPPER
Filed Dec. 11, 1922
1,578,290
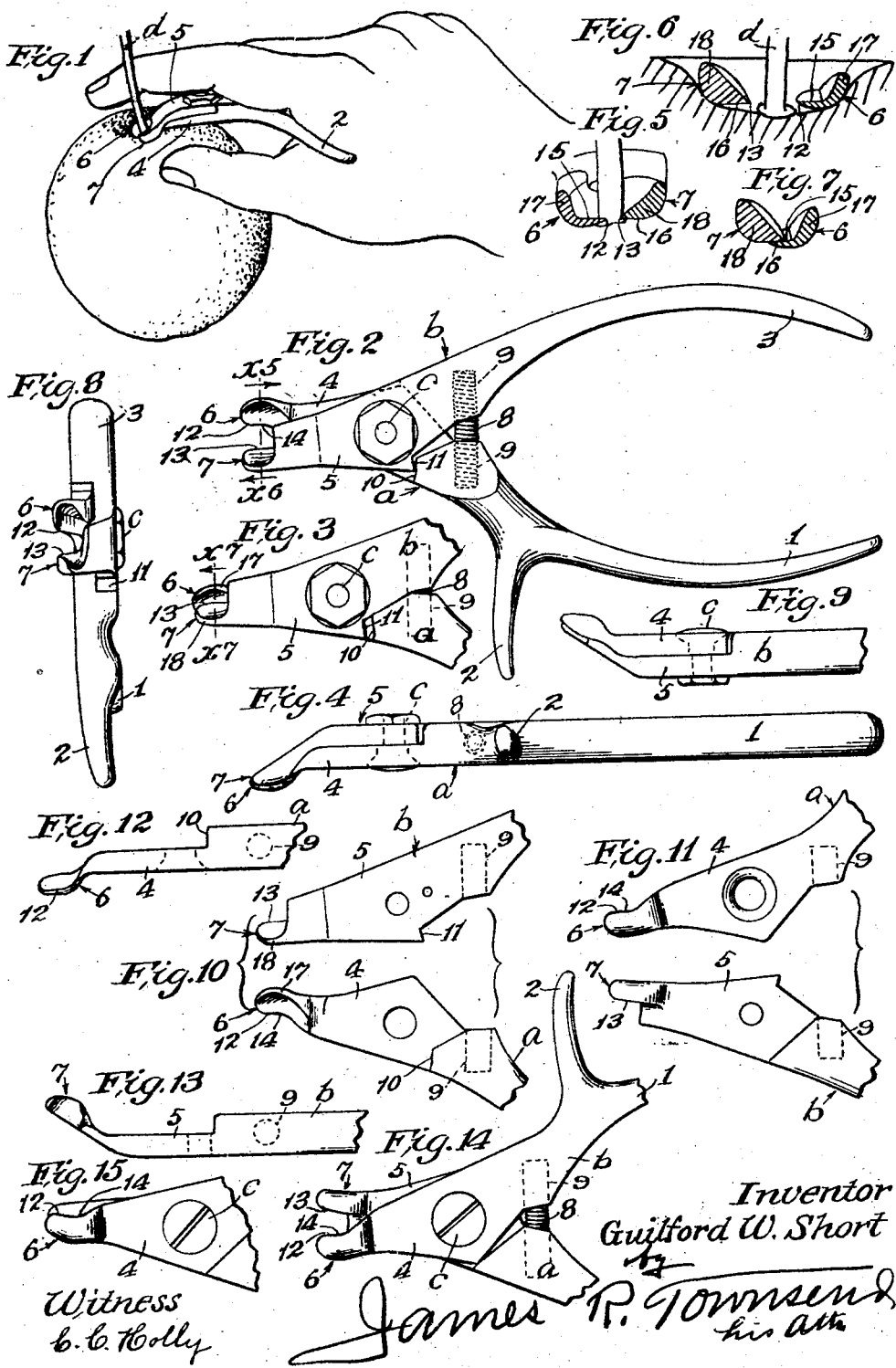
Inventor
Guilford W. Short
James R. Townsend
his Atty
Witness
E. C. Holly Patented Mar. 30, 1926.

1,578,290

UNITED STATES PATENT OFFICE.

GUILFORD W. SHORT, OF POMONA, CALIFORNIA.

SAFETY FRUIT CLIPPER.

Application filed December 11, 1922. Serial No. 606,274.

*To all whom it may concern:*

Be it known that I, GUILFORD W. SHORT, a citizen of the United States, residing at Pomona, in the county of Los Angeles and State of California, have invented a new and useful Safety Fruit Clipper, of which the following is a specification.

This invention is adapted to use for picking various fruits but is more especially intended for the use of orange pickers.

There is a considerable loss of oranges by decay during storage and shipment; and it is estimated that with the fruit clippers heretofore and now generally in use from three to five per cent of the loss by decay of the oranges in storage and in the course of shipping, is directly caused by injury to the rind of the oranges by the clippers used in clipping the stems.

It is very important that the stems be clipped so close to the orange that they will not be likely to abraid or scar oranges in the picker's bag and in the boxes or other packages used for their transportation.

Furthermore, as is well known many oranges have a depression around the stem and it is necessary that the clippers be of such character as to clip the stem below the level of the rim of such depression.

In the operation of picking oranges the orange picker usually carries a bag and uses his left hand to take hold of the orange on the tree while he severs its stem with the clippers held by his right hand, and he then drops the severed fruit into the bag; and an object of this invention is to greatly facilitate the use of the clipper holding hand in reaching orange laden limbs and bringing them into position where the next orange can be grasped by the left hand as soon as the severed orange has been dropped into the bag, and to enable the orange picker to simultaneously handle the limbs, fruit and clippers without likelihood of dropping the clippers.

An object of this invention is to provide a novel orange clipper which practically eliminates the likelihood of damaging the orange in the operation of properly clipping the same from its stem; and also to enable the orange picker to use his clipper-holding hand to handle the orange and the limb without any danger of dropping the clipper.

Another object of the invention is to make provision whereby the cut will be made clean through the bark of the stem from both sides of the stem and practically even across the stem so as to avoid any sharp points.

This invention involves a novel construction of yieldingly spread crossed members pivoted together and is broadly new, basic and pioneer in a number of features among which may be mentioned, a snubbed rib-reinforced cutting jaw construction, a smooth faced elongated shank construction beyond which the snubbed rib-reinforced cutting jaws project in an abrupt rounded hump adapted to enter the stem depression of the orange; triple handles, two of which are upon the first of the crossed jaw members and the third upon the second of said members; the first of such handles being adapted to lie between the thumb and the palm of the hand holding the clippers, the second handle being adapted to project from the first member in position to extend between the thumb and the second metacarpal of such hand; and the third handle being adapted to be held and operated by the bent fingers of said hand.

Another novel feature lies in the construction of two snubbed shearing jaws abruptly rounded externally at their tips and sides so as to avoid likelihood of cutting or bruising the rind of the fruit, the outer jaw being concave to receive the inner jaw and having a flattened inside face; while the inner jaw has an outer flattened portion to fit upon the flattened inner portion of the outer jaw; said flattened portions being edged; and the outer jaw being bevelled inwardly to its cutting edge.

This construction facilitates the cutting operation and makes it easy to sharpen the cutting edges.

Another feature is a recessed edge on the outer jaw to hold the edge from slipping when pressed thereonto by the inner jaw; the cutting portion of the outer jaw being thinner than the cutting portion of the inner jaw so that the main portion of the cut will be effected by that portion of the clippers which is adapted to be most readily sharpened.

Other objects, advantages and features of invention may appear from the accompanying drawing, the subjoined detail description and the appended claims.

The accompanying drawing illustrates the invention.

Figure 1 is a view showing the clippers in position clipping the stem of an orange.

Fig. 2 is a plan of the clippers spread.

Fig. 3 is a fragmental view of the clippers closed.

Fig. 4 is a side elevation of the clippers shown in Figs. 1, 2 and 3.

Fig. 5 is an enlarged section on line indicated at $x^5$—$x^6$, Fig. 2; the clippers being in the position shown in Fig. 1, and the sight being toward the clipper handles in the direction of the arrow at $x^5$.

Fig. 6 is an enlarged section of the clippers fully spread in a deep stem depression of an orange ready for closing on the stem, the sight being toward the ends of the jaws as indicated by the arrow at $x^6$, Fig. 2.

Fig. 7 is a section on line $x^7$, Fig. 3, looking toward the tip in the direction of the arrow.

Fig. 8 is a view looking at the tips of the jaws and toward the handle with the jaws spread as in Fig. 2.

Fig. 9 is a fragmental view of the clipper reversed from the position shown in Fig. 4.

Fig. 10 is a fragmental top plan of the two clipper members detached from each other.

Fig. 11 is a fragmental under side view of the two members shown in Fig. 10.

Fig. 12 is a fragmental outside edge view of the lower blade detached.

Fig. 13 is a fragmental outside edge view of the upper blade detached.

Fig. 14 is a fragmental view of the clippers showing the cutting ends of the snubbed jaws from the reverse side of Fig. 2.

Fig. 15 is a fragmental view of the reverse side of the clippers as shown in Fig. 3.

The clippers are constructed of two jaw carrying members $a$, $b$ crossed upon each other and pivoted together by pivot $c$; the first member $a$ is provided with two handles 1, 2, and the second member $b$ is provided with a third handle, 3. All the handles lie in a common plane on one side of the pivot $c$; the handle 1 being adapted to lie in the palm of the picker's hand; the handle 2 being adapted to extend outwardly between the thumb and the second metacarpal of such hand; and the third handle 3 being adapted to lie inside of, and to be operated by any of the fingers of said hand.

Said members $a$, $b$ are provided on the opposite side of the pivot $c$ with smooth faced elongated shanks 4, 5, respectively, lying in said plane common to said handles, and terminating in snubbed cutting jaws 6, 7 which are offset from the plane of said handles and shanks, and are normally held spread apart by means of a spring 8 seated in sockets 9 in the members on the handle side of the pivot.

Said members are provided with stops 10 and 11 which allow the edges 12 and 13 of the jaws to spread apart sufficiently to receive the stem $d$ of the orange, lemon or other fruit to be picked but which limit the spread of the offset snubbed cutting jaws to allow said jaws to be inserted into the stem depression of the fruit to grasp the stem. The edges 12, 13 of the respective jaws are arranged as shear edges and the first jaw 6 is externally convex and internally concave and its edge 12 is provided with a recess 14 to prevent the stem from slipping when forced thereonto by the edge 13 of the second jaw, which edge 13 is mainly straight and adapted to abut against the stem when pressure to force the handles 1 and 3 together is applied.

The general form of the jaws externally is semi-spheroidal and by reason of the offset beyond the shank, each terminates in a semi-spheroidal hump or projection that will enter the stem depression of the orange so as to clip the stem below the rim of such depression.

The outer snubbed jaw 6 is concave to receive the inner jaw 7 and has a flattened inside face 15 to receive a flattened outside face 16 of the inner jaw 7. Said jaws are rib reinforced, the ribs 17, 18 serving to give rigidity to the blades. The outer side of the jaws project downward beyond the plane of the shank so that the cutting jaws of the clippers terminate in a rounded hump, which is offset from the shanks.

Particular attention is directed to the snubbed ends of the clipper cutting jaws; they being contracted and made blunt so as not to cut the orange beyond the stem, or elsewhere, and terminate in a semi-spheroidal hump, the free ends of which terminate at approximately the lowest point of said hump when the handles are in a horizontal plane, as shown in Fig. 9.

In Figs. 5, 6 and 7 it will be seen that the cutting edge 12 of the jaw 6 is slightly above the lowest point of said jaw, thereby preventing cutting the rind of the fruit.

I claim:

1. A pair of fruit clippers of the character described having jaws the free ends of which are offset and terminate in a semi-spheroidal hump flattened on one side.

2. A fruit clipper having cutting jaws the outer ends of which are offset and terminate in an approximately semi-spheroidal hump, the free ends of which jaws terminate approximately at the lowest point of said hump; said cutting jaws having cutting edges adapted to cooperate with each other and one of which is adapted to override the other, and one of said jaws having a recess to prevent the fruit stem from slipping when forced thereonto by the edge of the other jaw.

In testimony whereof, I have hereunto set my hand at Los Angeles, California, this 23d day of November, 1922.

GUILFORD W. SHORT.